United States Patent [19]

Ishording

[11] Patent Number: 4,816,651
[45] Date of Patent: Mar. 28, 1989

[54] PROCESS AND APPARATUS FOR THE SIMULTANEOUS AND REMOTE READING AND CERTIFYING OF AN INFORMATION PRESENT IN A MEMORY OF AN ELECTRONIC MEDIUM

[75] Inventor: Willem Ishording, Chatenay-Malabry, France

[73] Assignee: U.S. Philips Corporation, New York, N.Y.

[21] Appl. No.: 167,804

[22] Filed: Mar. 14, 1988

[30] Foreign Application Priority Data

Mar. 13, 1987 [FR] France ............................... 8703467

[51] Int. Cl.[4] ............................................. G06F 15/30
[52] U.S. Cl. ..................................... 235/379; 235/280
[58] Field of Search ................................. 235/379, 380

[56] References Cited

U.S. PATENT DOCUMENTS 4,453,074 6/1984 Weinstein ............................. 235/380
4,544,833 10/1985 Ugon ..................................... 235/379

Primary Examiner—Harold I. Pitts
Attorney, Agent, or Firm—Thomas A. Briody; Jack E. Haken; Emmanuel J. Lobato

[57] ABSTRACT

Process for simultaneously reading and certifying, useing a processing device, an information present at an address in a memory of an electronic medium, in particular a removable and portable medium such as a memory card. The process uses a random number, generated in the processing device, as an encoding key for the address and the information read. Thus the information is certified if the sent address and the received address are identical. Preferably the encoding algorithm is the DES.

4 Claims, 1 Drawing Sheet

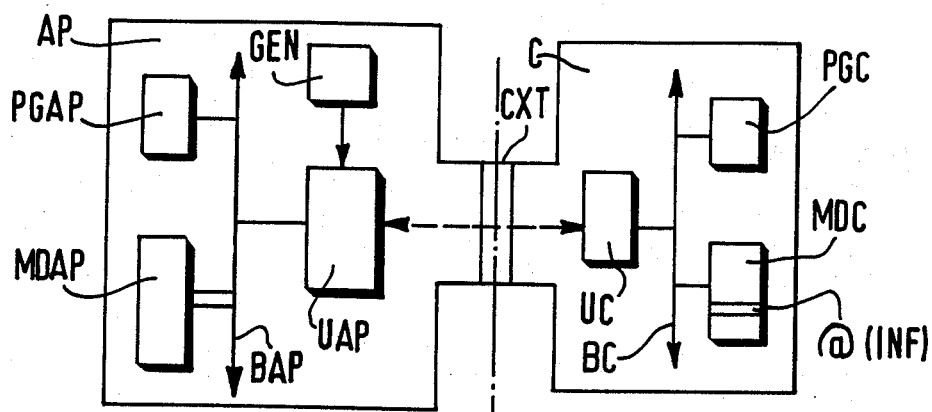
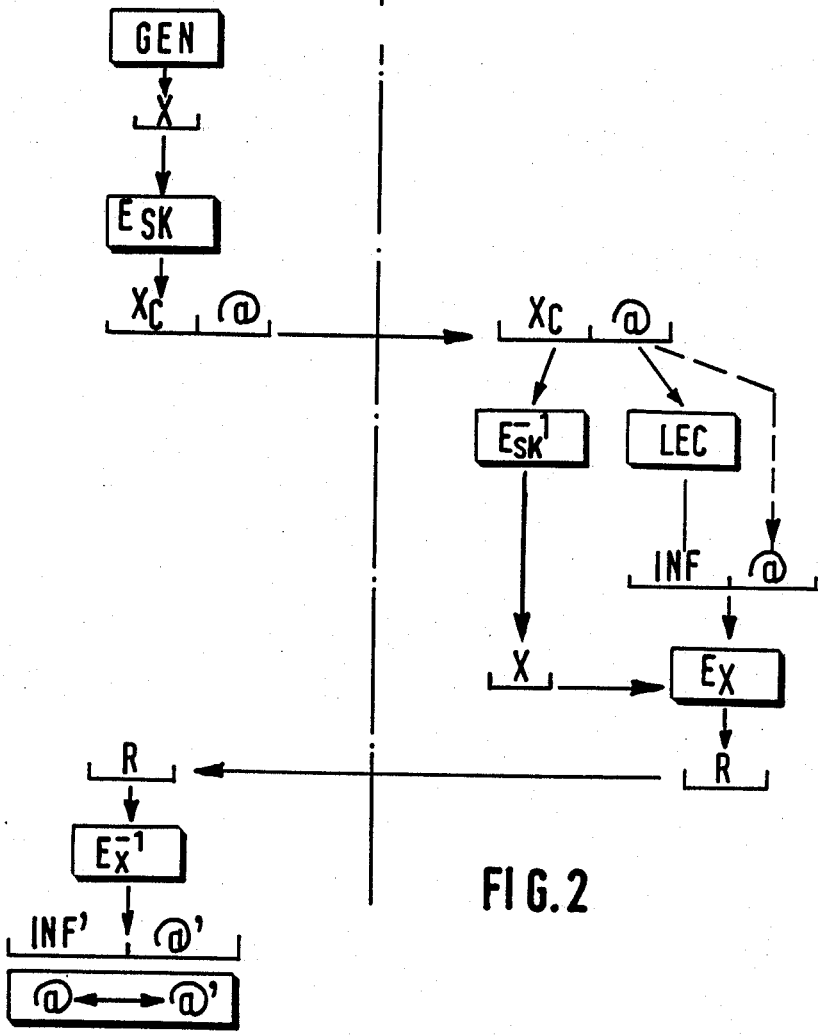
FIG.1
FIG.2

PROCESS AND APPARATUS FOR THE SIMULTANEOUS AND REMOTE READING AND CERTIFYING OF AN INFORMATION PRESENT IN A MEMORY OF AN ELECTRONIC MEDIUM

BACKGROUND OF THE INVENTION

The present invention relates to a process for simultaneously reading and certifying, using a processing device, information present at an address in a memory of an electronic medium, in particular a removable and portable medium such as a memory card, also called a microprocessor card or a chip card.

The invention is in the field of verification of information recorded in such a memory for the purpose of preventing a fraud from deceitfully intervening in the exchange of information between the memory card and a processing device enabling this card to be processed either locally or remotely.

It is known that for each envisaged application, exchanges of information are carried out between the card and the processing device in order to authorize persons to carry out protected operations.

Most of the applications require, at any particular time, the reading and/or writing of the information in the memory of the card, for example to retain a record of the operation carried out; it is therefore of prime importance to be able to verify with certainty the existence of the information present in the memory of the card; in order to facilitate this check, it is known that the processing device knows at which address, in the memory of the card, the said information is located.

According to patent EP No. 0,096,599 it is necessary that the processing device knows the content of the information to be checked in advance; thus the object of the check is to verify the conformity of the information.

This prior knowledge of the content of the information is a disadvantage when the processing device does not know the information to be read, which is particularly the case when it is not the device which caused the writing of the information.

The object of the present invention is to remove this disadvantage.

SUMMARY OF THE INVENTION

For this purpose a process for, simultaneously, reading and certifying the information is carried out by the successive execution of the following steps:

a. A random number generator provided in the processing device delivers a random number X, b. A reversible algorithm E provided in the processing device encodes the random number X with the secret key SK belonging to the card to be processed, giving the value $X_c$, c. The value $X_c$ is transmitted to the card as well as the address @ from which it is required to read, d. The same reversible algorithm E, provided in the card, decodes, using the same secret key SK, the value $X_c$, giving the value X, e. The card uses the address @ to read the information INF, f. The card encodes, using the key X, the address @ and the information INF, giving a result R, g. The result R is transmitted to the processing device, h. The processing device decodes the result R and then compares the address thus decoded with the said address @, in such a way that, when the addresses are equal, the information INF received and decoded by the processing device is certified.

Within the scope of the present invention, it is not important whether the processing device is situated locally, for example a sale point terminal, a card reader ..., or remotely, for example a central computer connected to the card reader by a communications network.

The reading of information takes place in the time, after a preliminary phase of mutual recognition between the card and the processing device. This preliminary phase is generally carried out immediately after the physical insertion of the card into the card reader, and it has a particular object of transferring the identification of the card to the processing device. It it is from this identifier that the processing device is capable of knowing, for example by means of an internal table, the secret key SK belonging to the card.

The invention also relates to apparatus for the simultaneous and remote reading and certifying of an information present in a memory of an electronic medium.

BRIEF DESCRIPTION OF THE DRAWINGS

The present invention will be better understood with the help of a non-limiting example of embodiment described with the following drawings:

FIG. 1 is a concise representation of a processing device connected to a memory card, FIG. 2 is a block diagram representing the steps of the process which is the subject of the invention.

DETAILED DESCRIPTION OF THE INVENTION

In FIG. 1 there are shown a card C connected to a processing device AP by means of a temporary connection device CXT.

The temporary connection device places the processing unit of the device UAP in communication with the processing unit of the card UC. In a known way, the connection device at least transmits a power supply voltage to the electronic circuits of the card and transmits information between the two processing units by means, for example, of a serial communication line.

In the carde C there is shown a bus BC which places the processing unit UC in communication with a program memory PGC, for example a ROM, and with a data memory MDC, for example an EPROM. The data INF to be read at the address @ is located in the data memory MDC. This architecture shows that the data INF is not directly accessible by the processing device AP: which must transmit a read request to the processing unit UC of the card.

In the processing device there is shown a bus BAP which puts the processing unit UAP into communication with a program memory PGAP, for example a ROM, and with a data memory MDAP, for example an EPROM.

At the moment of the connection of the card C with the processing device AP, a mutual recognition procedure is carried out. This is a known procedure from which results at least one secret key belonging to each card being made available in the processing device. For example, the secret key SK is then stored on the one hand in the data memory of the card MDC and on the other hand in the data memory of the device MDAP.

During dialog, it is appropriate to take precautions against any attempt at fraud which would consist, for example, in transmitting false information with a branch line improperly connected to the means of connections. Thus at the time of a request for reading information INF formulated by the processing device, a check procedure must be provided.

According to the present invention the reading and the check procedure are carried out simultaneously as part of a same process. This process uses a random number generated by a generator GEN located in the processing device AP. This process also uses a reversible encoding-decoding algorithm E stored on the one hand in the program memory PGAP of the processing device and, on the other hand, in the program memory PGC of the card.

In the rest of the text, the following notation is used:

$$D_c = E_k(D) \text{ or } D = E_k{-1}(D_c)$$

which has the following significance:

The datum is clear D encoded by the algorithm E and the key K in order to provide the encoded datum $D_c$; in reverse the encoded datum $D_c$ is decoded by the algorithm $E^{-1}$ and the key K in order to provide the datum in clear D.

The successive steps on the left hand side are carried out in the processing device and the steps in the right hand side are carried out in the card. Each horizontal arrow represents a transaction between the processing device and the card.

The first step consists in starting the random number generator GEN which provides a number X which is encoded with the secret key SK belonging to the card giving $$X_c = E_{SK}(X)$$

The datum $X_c$ is transmitted with the read address @ to the card.

In the card, the datum $X_c$ is decoded ($E_{SK}-1$) in order to provide X, and the address @ is used for reading the sought information INF.

Now the assembly constituted by the information INF and the address @ is encoded with the same algorithm E but, this time, with the key X giving the result R $$R = E_X(\text{INF}, @)$$

The result R is transmitted to the processing device in which R is decoded which provides INF' and @':

$$\text{INF}', @' = E_x{-1}(R)$$

If everything takes place normally, it is clear that @ must be equal to @', and, in this case, it is certain that INF'=INF, i.e. that the information read is certified as being that which appears in the card at the address @.

The process has the advantage that there is practically no chance that the contents of the messages transmitted are the same twice. This complicates the task of a fraud who observes the signals at the level of the means of connection (CXT).

In a preferred embodiment, the encoding-decoding algorithm is the algorithm known as the Data Encryption Standard or DES.

On a hardware level, the process described is practiced with standard data processing elements that have been widely reported in literature. The difference is on the procedure level and the result is a greatly improved protection of sensitive information.

What is claimed is:

1. Process for simultaneously reading and certifying, using a processing device, an information present at an address in a memory of an electronic medium, in particular a removable and portable medium such as a card, characterized in that there is a successive execution of the following steps:
  a. A random number generator provided in the processing device delivers a random number X,
  b. A reversible algorithm E provided in the processing device encodes the random number X with the secret key SK belonging to the card to be processed, giving the value $X_c$,
  c. The value $X_c$ is transmitted to the card as well as the address @ from which it is required to read,
  d. The same reversible algorithm E, provided in the card, decodes, using the same secret key SK, the value $X_c$, giving the value X,
  e. The card uses the address @ to read the information INF,
  f. The card encodes, using the key X, the address @ and the information INF, giving a result R,
  g. The result R is transmitted to the processing device,
  h. The processing device decodes the result R and then compares the address thus decoded with the said address @, in such a way that, when the addresses are equal, the information INF received and decoded by the processing device is certified.

2. Process according to claim 1, characterized in that the encoding-decoding algorithm E is the Data Encryption Standard (DES).

3. An apparatus for simultaneously reading and certifying information in a memory remote from the apparatus, comprising:
  a processing apparatus comprising a random number generator, a first data memory, a first program memory, and first processing means for receiving input data, data stored in said first data memory and program instructions from said first program memory for processing the input data, stored data and random number under control of said first program memory;
  a portable device for containing information to be certified by said processing apparatus, said portable device comprising a second data memory for storing data including data representing the information to be verified, a second program memory, and second processing means for receiving input data, data stored in said second data memory and program instructions from said second program memory for processing input data under control of said second program memory;
  connecting means for permitting the temporary connection of said processing apparatus and said portable device to permit the exchange of data between said first and said second processing means; and
  said first and said second program memories having stored programs effective for operating said first and said second processing means to certify information in said second data memory while said processing apparatus and said portable device are connected by said connecting means, according to the steps of
    (i) generating a random number X with said random number generator, (ii) encoding the random number X within said processing apparatus by a reversible algorithm E with a secret key SK corresponding to said portable device to obtain the result $X_c$, (iii) transmitting the value $X_c$ to said portable device together with the address @ of the information to be read and verified, (iv) decoding the value $X_c$ within said portable device by said reversible algorithm E using the secret key SK to obtain the value X, (v) reading the information INF within said portable device using the address @ transmitted from said processing apparatus, (vi) encoding the address @ and the information INF within said portable device by the algorithm E with the random number X as the key to obtain the result R, (vii) transmitting the result R to said processing apparatus, and (viii) decoding the result R within said processing apparatus by the algorithm E using the random number X as a key, comparing the results with the original address @]and certifying the information INF when the decoded address is identical to the original address @.

4. An apparatus according to claim 3, wherein said reversible algorithm E is the Data Encryption Standard.

* * * * *